United States Patent [19]
Yarbrough

[11] Patent Number: 5,614,227
[45] Date of Patent: Mar. 25, 1997

[54] EXTRUSION APPARATUS

[75] Inventor: Harvey M. Yarbrough, Ringgold, Ga.

[73] Assignee: Illinois Tool Works, Inc., Glenview, Ill.

[21] Appl. No.: 385,433

[22] Filed: Feb. 8, 1995

[51] Int. Cl.$^6$ .............................. B29B 7/46; B29C 47/06; B29C 47/48

[52] U.S. Cl. ................. 425/133.1; 425/142; 425/204; 425/205; 425/297; 425/311; 366/83; 366/91

[58] Field of Search .................................... 425/205, 204, 425/209, 142, 462, 131.1, 133.1, 466; 366/833, 91, 292, 297, 298; 425/311, 308, 297

[56] References Cited

U.S. PATENT DOCUMENTS

| | | |
|---|---|---|
| 2,813,302 | 11/1957 | Beck ........................................ 425/204 |
| 3,383,096 | 5/1968 | Braibanti et al. . |
| 4,077,753 | 3/1978 | Tanaka ................... 425/131.1 |
| 4,094,946 | 6/1978 | Finkensiep et al. ................ 425/131.1 |
| 4,124,307 | 11/1978 | Anisic . |
| 4,467,969 | 8/1984 | Godfrey et al. . |
| 4,802,140 | 1/1989 | Dowling . |
| 4,859,068 | 8/1989 | Sironi ................... 425/131.1 |
| 5,230,476 | 7/1993 | Rust et al. . |
| 5,253,994 | 10/1993 | Zweig et al. . |

FOREIGN PATENT DOCUMENTS 54-124068  9/1979  Japan ......................................... 425/204

Primary Examiner—Khanh P. Nguyen
Attorney, Agent, or Firm—Richard C. Litman

[57] ABSTRACT

An apparatus for creating extrusions having an inner portion of one substance and an outer portion of another substance. The apparatus includes two bins that each receives a different type of material, two multi-paddle members for feeding material, an inner worm screw conveyor, an outer worm screw conveyor, a casing maintaining distinct materials within the worm screw conveyors while separated from one another, an electronic eye assembly for detecting the amount of material extruded, a material cutting mechanism, a replaceable nozzle, and two independent motors for driving the worm screw conveyors. In operation, the feeding members feed materials from the bins to the worm screw conveyors, which convey the material to the replaceable nozzle. The materials are expelled from the nozzle in such a way that one type of material forms an outer portion, and the other type of material forms an inner portion. The motors are coupled to the conveyors by gears allowing variation of the speed of conveying of materials. By replacement of the nozzle, the ratio of one material to the other in the extrusion can be changed. The variability of the speed of the conveyors ensures that the materials can be extruded at a single rate, so that they will properly form a single extrusion.

9 Claims, 3 Drawing Sheets

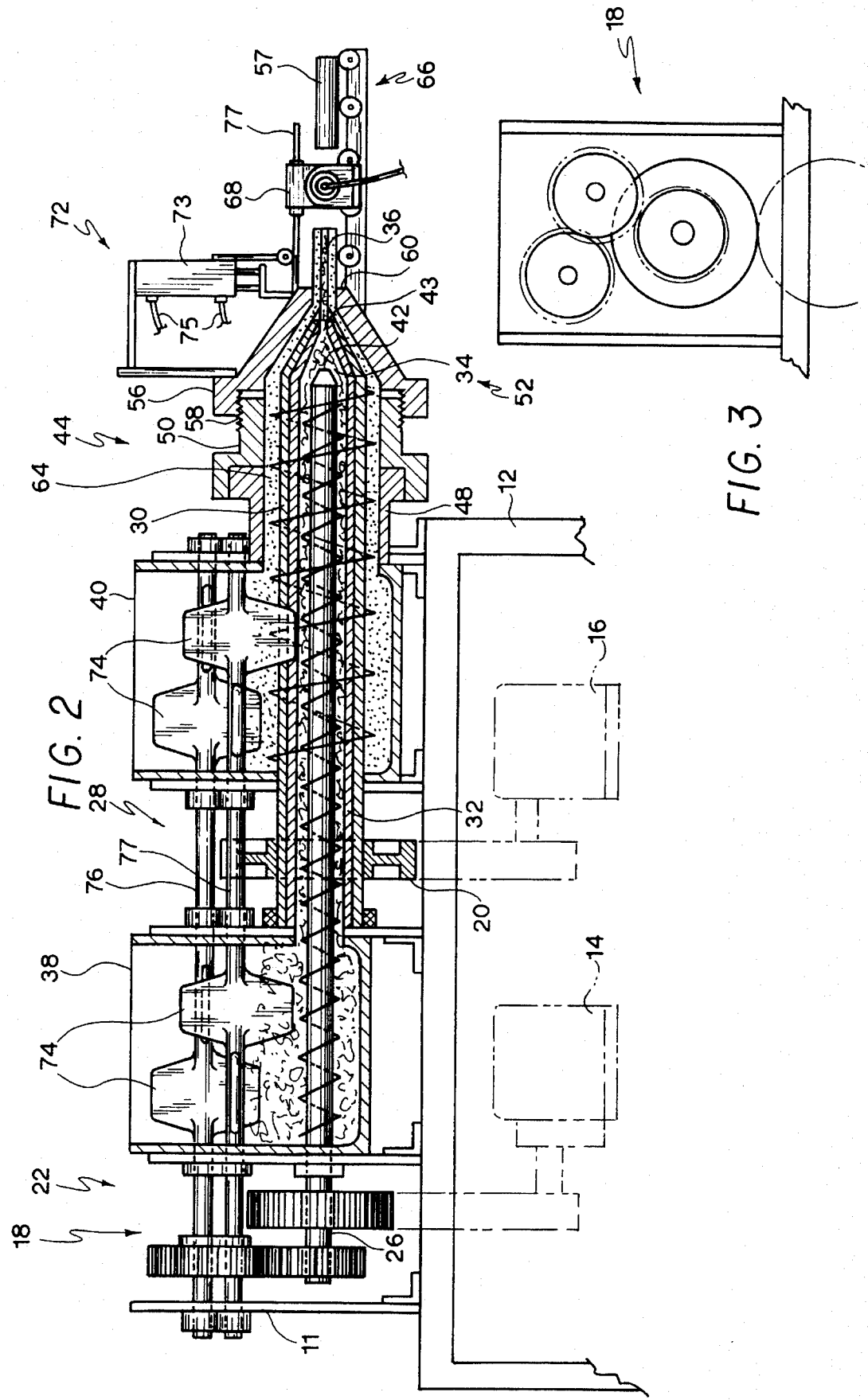

EXTRUSION APPARATUS

BACKGROUND OF THE INVENTION

1. Field of the Invention

The present invention relates generally to apparatus for extruding flowing, viscous substances, and more particularly to apparatus for extruding distinct such substances in predetermined ratios in one piece without significant intermixture of substances.

2. Description of the Prior Art

There are numerous uses for apparatus which extrude materials. Some of these uses require that an extrudate be composed of multiple, distinct components. For example, it is often desirable to have epoxy resin and curing agent in single extrudate for the sake of convenience. In this way, the components may be cut from a length of the extrudate, and they will already be present in the desired ratio of components. Yet, when there are two components of an epoxy compound in a single extrudate, they must remain unmixed before use in order to prevent premature curing. Thus, there is a need for an apparatus which is capable of producing an extrudate composed of distinct, unmixed components. Such an apparatus should have a simple mechanism for controlling the relative ratios of the components in the extrudate, and for ensuring that the linear flow rates of the components of the extrudate are identical, thereby avoiding flow friction between the components and consequent mixing of the components with one another. Numerous extrusion apparatus have been invented, but none fully meets this clearly defined need.

U.S. Pat. No. 3,383,096, issued on May 14, 1968, to Mario Braibanti, et al., describes an apparatus for mixing alimentary pastes. The apparatus has multiple vats in which blades propel a mixture to passages disposed at bottom ends of the vats. A conveying screw receives the mixture. The apparatus is designed to ensure a particular consistency in bread dough. The patent does not suggest any way to keep distinct ingredients in a combination of ingredients separate from one another, or any way to maintain identical linear flow rates of distinct ingredients despite different volumetric flow rates. The patent also does not suggest variation of an output nozzle configuration for the purpose of varying ratios of ingredients in a combination of ingredients.

U.S. Pat. No. 4,124,307, issued on Nov. 7, 1978, to Ladislav Anisic, describes a homogenizer for viscous substances. The homogenizer uses screws to force a mass through rotary bodies in annular grooves. The patent teaches away from keeping distinct ingredients in a combination of ingredients separate from one another, and does not suggest any way to maintain identical linear flow rates of distinct ingredients despite different volumetric flow rates. The patent also does not suggest variation of an output nozzle configuration for the purpose of varying ratios of ingredients in a combination of ingredients.

U.S. Pat. No. 4,467,969, issued on Aug. 28, 1984, to Jack F. Godfrey, et al., describes a reclamation system that uses augers to transfer chopped resin to be mixed with virgin resin. The patent teaches away from keeping distinct ingredients in a combination of ingredients separate from one another, and does not suggest any way to maintain identical linear flow rates of distinct ingredients despite different volumetric flow rates. The patent also does not suggest variation of an output nozzle configuration for the purpose of varying ratios of ingredients in a combination of ingredients.

U.S. Pat. No. 4,802,140, issued on Jan. 31, 1989, to Edward H. Dowling, describes an injection molding method and apparatus. The apparatus has an outer screw that rotates and plunges forward to inject plastic. There is an inner screw that remains stationary. The patent does not suggest any way to keep distinct ingredients in a combination of ingredients separate from one another, or any way to maintain identical linear flow rates of distinct ingredients despite different volumetric flow rates. The patent also does not suggest variation of an output nozzle configuration for the purpose of varying ratios of ingredients in a combination of ingredients.

U.S. Pat. No. 4,859,068, issued on Aug. 22, 1989, to Giovanni Sironi, shows a screw type extruder with inner and outer flow chambers defined by a single, hollow screw having external and internal threads. The chambers can communicate with one another or they can be separated. When they are separated, they can extrude two layers of different materials. The patent does not suggest any way to maintain identical linear flow rates of distinct ingredients despite different volumetric flow rates. The patent also does not suggest variation of an output nozzle configuration for the purpose of varying ratios of ingredients in a combination of ingredients.

U.S. Pat. No. 5,230,476, issued on Jul. 27, 1993, to Marcus Rust, et al., describes a vertical grinding and mixing tower having dual tanks. The tower is designed to provide for the grinding and mixing of diverse elements to produce feed. The patent teaches away from keeping distinct ingredients in a combination of ingredients separate from one another, and does not suggest any way to maintain identical linear flow rates of distinct ingredients despite different volumetric flow rates. The patent also does not suggest variation of an output nozzle configuration for the purpose of varying ratios of ingredients in a combination of ingredients.

U.S. Pat. No. 5,253,994, issued on Oct. 19, 1993, to Konrad Zweig, et al., describes a system for molding a synthetic resin using plastic scraps. The system has a receptacle for recycled granules and a receptacle for virgin granules. The recycled granules are filtered and then mixed with virgin granules. The patent teaches away from keeping distinct ingredients in a combination of ingredients separate from one another, and does not suggest any way to maintain identical linear flow rates of distinct ingredients despite different volumetric flow rates. The patent also does not suggest variation of an output nozzle configuration for the purpose of varying ratios of ingredients in a combination of ingredients.

None of the above patents demonstrates the use of an adjustable electronic/optical sensor that determines the output of the extrusion in order to determine when it should be cut. None of the above inventions and patents, taken either singly or in combination, is seen to describe the instant invention as claimed.

SUMMARY OF THE INVENTION

An apparatus according to the present invention is useful for creating extrusions having an inner portion of one substance and an outer portion another substance. The apparatus comprises two bins that each receive a different type of material, two multi-paddle feeding members, an inner worm screw conveyor, an outer worm screw conveyor, casings maintaining distinct materials within the worm screw conveyors while separated from one another, an electronic eye assembly for detecting an amount of material extruded, a material cutting mechanism, a replaceable, adjustable nozzle, extrudate-receiving rollers, and two independent motors for driving the worm screw conveyors. In operation, the feeding members feed materials from the bins to the worm screw conveyors, which convey the material to the replaceable nozzle. The materials are expelled from the nozzle in such a way that one type of material forms an outer portion, and the other type of material forms an inner portion. The motors are coupled to the conveyors by gears allowing variation of the speed of conveying of materials. By replacement of the nozzle, the ratio of one material to the other in the extrusion can be changed. The variability of the speed of the conveyors ensures that the materials can be extruded at a single rate, so that they will properly form a single extrusion.

Accordingly, it is a principal object of the invention to provide an extrusion apparatus that maintains distinct materials separate from one another during the process of extruding such materials into a single extrudate.

It is another object of the invention to ensure that the linear flow rate of materials that comprise an extrudate are identical during the formation of the extrudate.

It is a further object of the invention to allow convenient variation of the relative ratios of components in an extrudate.

Still another object of the invention is to prevent intermixing of distinct components in an extrudate.

Still a further object of the invention is to provide automatic cutting of an extrudate.

Yet a further object of the invention is to allow convenient variation of cut length of an extrudate.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is a side section view of the apparatus of the present invention.

FIG. 3 is a plan view of the gearing on a rear portion of the apparatus.

Similar reference characters denote corresponding features consistently throughout the attached drawings.

DETAILED DESCRIPTION OF THE PREFERRED EMBODIMENT

Figure 1:
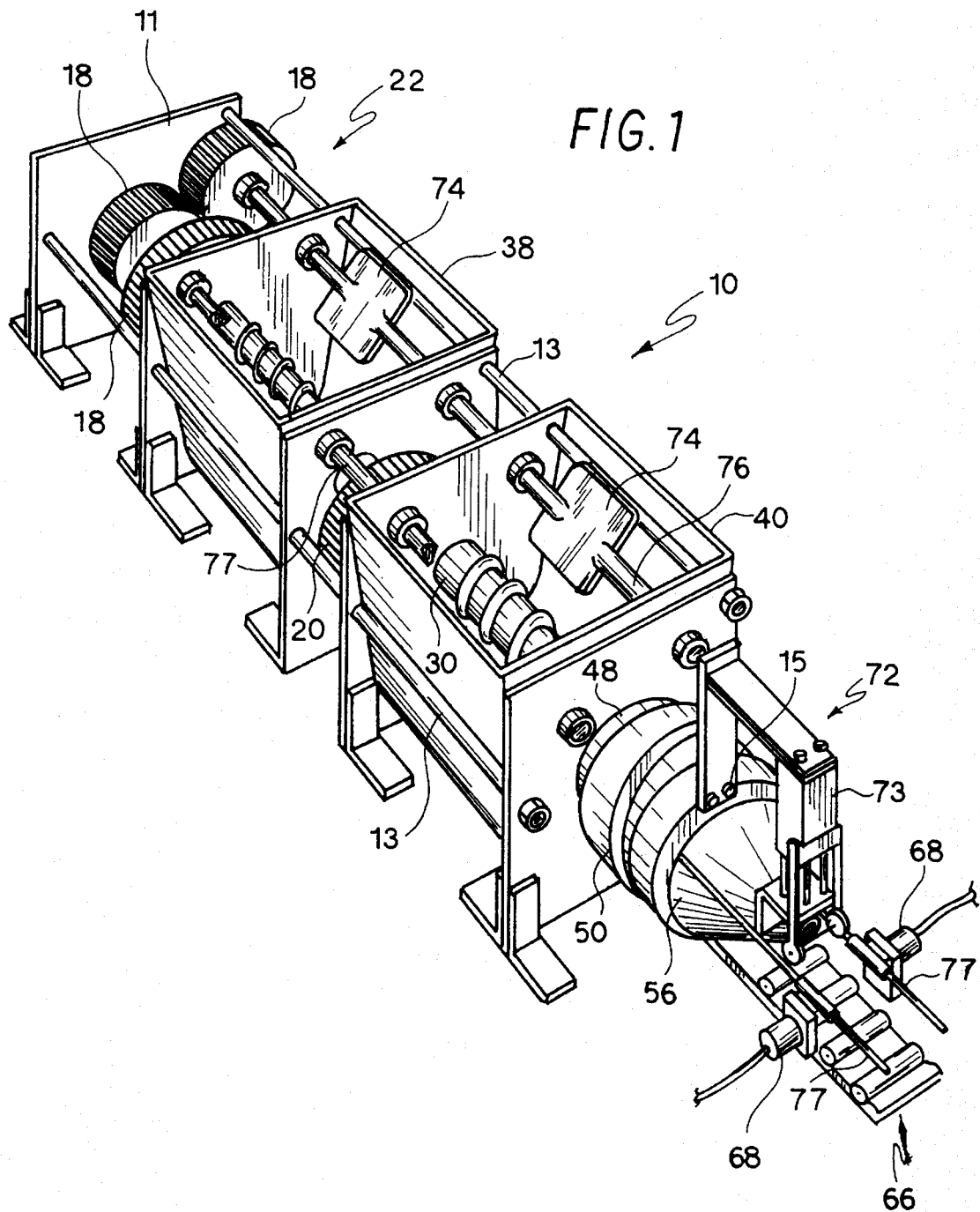
FIG. 1 is an environmental, perspective view of the apparatus.
Figure 4:
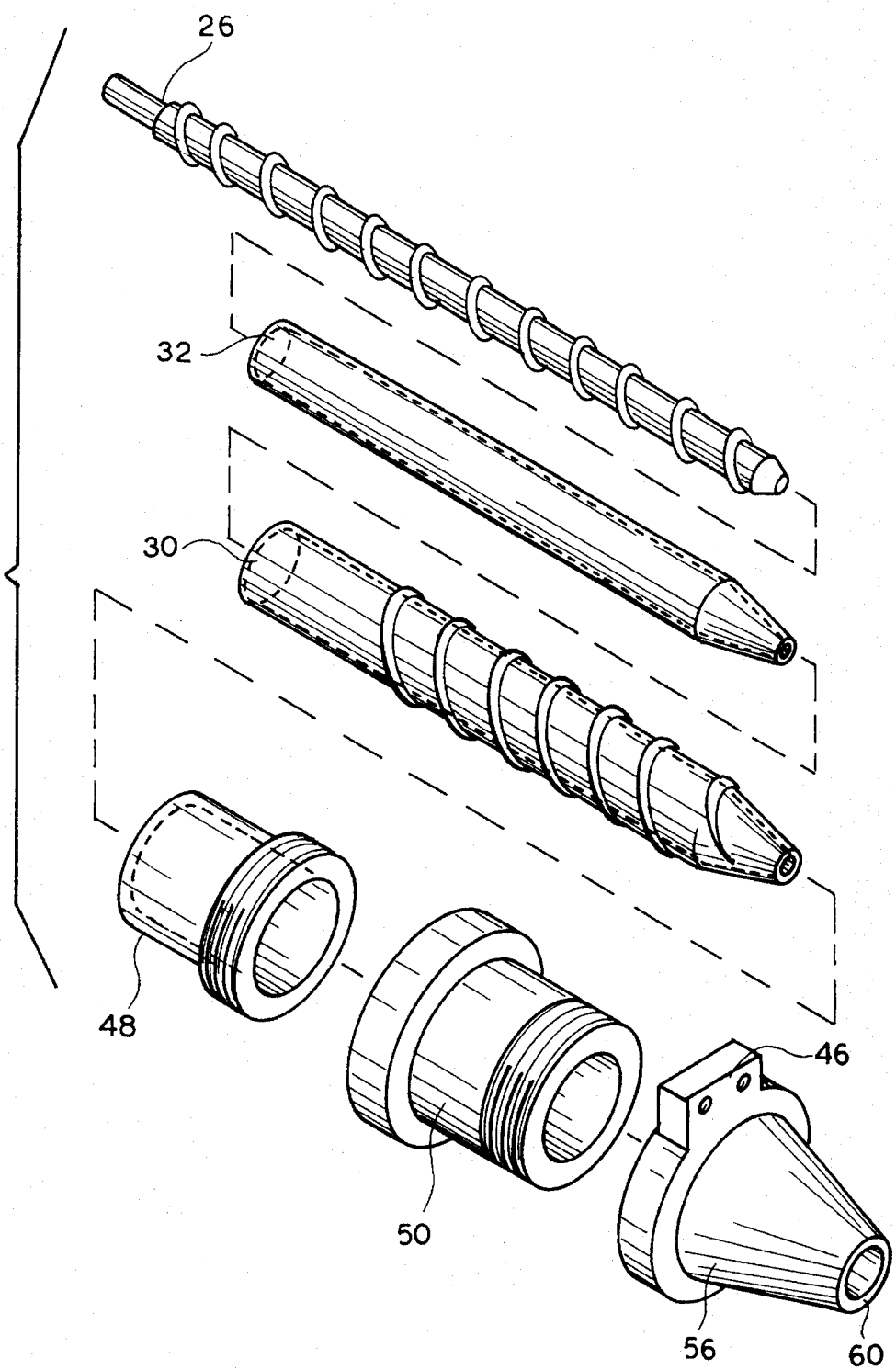
FIG. 4 is an exploded view of the conveyors, casing and nozzle parts of the present invention.

There is a well-defined need for an apparatus capable of extruding distinct substances in a single extrudate according to a predetermined ratio without significant intermixture of the substances. The present invention meets this need by providing an apparatus for creating extrusions having an inner portion of one substance and an outer portion another substance. The present invention comprises two bins that each receives a different type of material, two multi-paddle feeding members, an inner worm screw conveyor, an outer worm screw conveyor, casings maintaining distinct materials within the worm screw conveyors while separated from one another, an electronic eye assembly for detecting the amount of material extruded, a material cutting mechanism, a replaceable nozzle, and two independent motors for driving the worm screw conveyors. In operation, the feeding members feed materials from the bins to the worm screw conveyors, which convey the material to the replaceable nozzle. The materials are expelled from the nozzle in such a way that one type of material forms an outer portion, and the other type of material forms an inner portion. The motors are coupled to the conveyors and feeding members by gears allowing variation of the speed of conveying of materials. By replacement of the nozzle, the ratio of one material to the other in the extrusion can be changed. The variability of the speed of the conveyors ensures that the materials can be extruded at a single rate, so that they will properly form a single extrusion.

Referring to the drawings, the extrusion apparatus 10 is shown on a supporting base 12. Underneath the base 12, there are two variable-speed motors 14, 16 which drive gears 18, 20. On a rear portion 22 of the apparatus 10, gears 18 driven by one motor 14 rotate paddle shafts 76, 77 and an inner, solid worm screw conveyor 26. On a central portion 28 of the apparatus 10, a gear 20 driven by the other motor 16 rotates an outer, hollow worm screw conveyor 30. The inner conveyor 26 and outer conveyor 30 are separated by a conveyor casing 32, thereby defining an inner compartment 34. The conveyor casing 32 has a casing aperture 36 through which material (not shown) conveyed by the inner conveyor 26 can be extruded.

There are two material-receiving bins 38, 40, held to a back plate 11 by rods 13. The inner conveyor 26 projects from the rear portion 22 of the apparatus 10 through a first bin 38, through a space between the bins comprising the central portion 28 of the apparatus 10, through a second bin 40, and ends at a point in space 42 in a front portion 44 of the apparatus, above a reference point (not shown) on the base 12. The conveyor casing 32 projects from the central portion 28 of the apparatus 10, through the second bin 40, and ends in the front portion 44 of the apparatus 10, somewhat beyond the point 42 where the inner conveyor 26 ends, above the reference point on the base 12. The outer conveyor 30 projects from the central portion 28 of the apparatus 10, through the second bin 40 and ends at a point in space 43 in a front portion 44 of the apparatus 10, somewhat beyond where the conveyor casing 32 ends, above the reference point on the base.

A nozzle-receiving extension 48 projects from the second bin 40 into the front portion 44 of the apparatus 10. A first part 50 of a nozzle 52 can be releasably attached to the extension 48. A second part 56 of the nozzle 52 engages the first part 50 of the nozzle 52, preferably by screw-threading 58, and may be adjusted so as to be nearer to or farther from the point in space 43 where the outer conveyor ends, such that the nozzle 52 may be varied in length. The second part 56 of the nozzle 52 has an extrudate expelling terminal opening 60. The second part 56 also has a cutter mechanism receiving portion 46, to which a cutter mechanism 72 can be affixed, as by bolts 15. The extension 48 and first nozzle part 50 and second nozzle part 56 surround portions 62 of each of the inner conveyor 26, outer conveyor 30 and the conveyor casing 32 that project beyond the second bin 40 into the front portion 44 of the apparatus 10, thereby forming an outer compartment 64 that receives material (not shown) from the second bin 40 and releases that material through the terminal opening 60. The outer compartment 64 does not communicate with the inner compartment 34. Because of the adjustability of the second part 56 of the nozzle 52, volume of material released from the outer compartment 64 can be varied by adjusting the length of the nozzle 52. When the inner compartment 34 receives material (not shown) from the first bin 38 and expels it from the casing aperture 36 in the conveyor casing 32, this variation of volume changes an extrudate's 57 relative ratio of material from the first bin 38 to material from the second bin 40.

Paddles 74 extend from paddle-shafts 76, 77 projecting from the rear portion 22 of the apparatus 10 through the first bin 38, through a space between the bins comprising the central portion 28 of the apparatus 10, and through a second bin 40. Motor 14 rotates paddle-shafts 76, 77 via gears 18, thereby feeding materials (not shown) inserted into bins 38, 40 to conveyors 26, 30.

Independent variation of the rate at which the conveyors 26, 30 rotate varies independently the linear flow rate of materials from the first bin 38 and the second bin 40 through the inner compartment 34 and outer compartment 64, respectively. In this way, variation in volumetric flow rate from the outer compartment 64 caused by adjustment of the second part 56 of the nozzle 52 need not prevent the linear flow rate of material from the inner compartment 34 and outer compartment 64 from being identical. It is important that these linear flow rates be identical in order to avoid mixing of material from the first bin 38 with that of the second bin 40 caused by flow of one material at a different linear flow rate from that of the other material and consequent friction between the materials. In addition to the unwanted mixing that such different linear flow rate would create, the different linear flow rate would result in improperly formed extrudate 57 because a faster-flowing material would tend to bunch up relative a slower-flowing material, and an undesired ratio of one material to the other would result.

When an extrudate 57 is extruded through the terminal opening 60 in the second part 56 of the nozzle 52, the extrudate is received by extrudate-receiving rollers 66, which have a rolling axis (not shown) oriented in a direction perpendicular to an extrudate flow direction. These extrudate-receiving rollers 66 receive an extruded extrudate 57 in such a way that it is supported, yet its flow is unhampered. The extrudate 57 so received continues to flow until an optical-electronic sensor 68 adjustably positioned along an extrudate flow path 70 senses that the extrudate 57 has reached a predetermined length. By varying the position of the sensor 68, the cut length of the extrudate 57 can be varied. When that sensing occurs, a wire-style cutter mechanism 72 actuated by a pneumatic cylinder 73 supplied by pneumatic lines 75 cuts the extrudate 57 at a point beyond the second part 56 of the nozzle 52. Two guiding prongs 77 project from the apparatus 10 and ensure that the cutter mechanism 72 is guided properly to the extrudate 57 as a cut occurs. The cutter mechanism 72 is adjustable so that the extrudate will be cut nearer to or farther from the second part 56 of the nozzle 52, depending on the adjustment. Preferably, the extrudate 57 is cut at a point immediately beyond the second part 56 of the nozzle 57. However, with thicker extrudates, the cutting should occur farther away from the second part 56 of the nozzle 52.

Because of the nature of the extrusion apparatus 10 according to the present invention, an extrudate of distinct components can be formed without significant inter-mixture of the components. Moreover, the relative ratios of the components in the extrudate can be varied easily and conveniently. The apparatus 10 also allows independent adjustment of each component's linear flow rate to be equal to that of each other component, despite differences of volumetric flow rates between the components related to variations in the relative ratios of the components desired in the extrudate. Further, the apparatus allows automatic cutting of the extrudate and simple variation of cut extrudate length.

It is to be understood that the present invention is not limited to the sole embodiment described above, but encompasses any and all embodiments within the scope of the following claims.

I claim:

1. An extrusion apparatus comprising:

an inner worm screw conveyor;

a hollow casing including a terminal end having a casing aperture therethrough, said casing concentrically surrounding a portion of said inner worm screw conveyor;

an outer worm screw conveyor concentrically surrounding said hollow casing;

a nozzle including a terminal end having a terminal opening therethrough, said terminal opening proximate said casing aperture, said nozzle concentrically surrounding a portion of said outer worm screw conveyor;

a first material-receiving bin in fluid communication with said inner conveyor; and a second material-receiving bin in fluid communication with said outer conveyor;

whereby said inner conveyor conveys one material through said casing aperture into another material conveyed by said outer conveyor through said terminal opening.

2. The apparatus according to claim 1, further including at least two motors, each of said motors engaging one and only one of said conveyors.

3. The apparatus according to claim 1, further including a plurality of paddles projecting into said bins and dimensioned and configured to propel any contents of said bins towards casing aperture and said terminal opening.

4. The apparatus according to claim 1, further including a plurality of extrudate-receiving rollers.

5. The apparatus according to claim 1, further including:

a sensing mechanism that makes a determination when an extrudate has been extruded to a predetermined length; and a means for extrudate cutting that cuts an extrudate when said sensing mechanism makes said determination.

6. The apparatus according to claim 2, wherein said motors are adjustable so as to turn each of said conveyors at a different rate relative to each other of said conveyors.

7. The apparatus according to claim 1, wherein said nozzle is replaceable and adjustable.

8. The apparatus according to claim 1 wherein said conveyors rotate at different rates from one another.

9. The apparatus according to claim 7, wherein adjusting said length of said nozzle unit varies a volume of material extruded from said outer compartment.

\* \* \* \* \*